United States Patent [19]
Hattori

[11] Patent Number: 4,552,549
[45] Date of Patent: Nov. 12, 1985

[54] V-BELT TRANSMISSION DEVICE

[75] Inventor: Torao Hattori, Saitama, Japan

[73] Assignee: Honda Giken Kogyo Kabushiki Kaisha, Tokyo, Japan

[21] Appl. No.: 587,357

[22] Filed: Mar. 8, 1984

[30] Foreign Application Priority Data

Mar. 8, 1983 [JP] Japan .............................. 58-32268[U]
Mar. 8, 1983 [JP] Japan .................................. 58-36650
Apr. 16, 1983 [JP] Japan .................................. 58-66327

[51] Int. Cl.$^4$ .............................................. F16G 1/28
[52] U.S. Cl. .................................... 474/202; 474/204; 474/242; 474/201
[58] Field of Search ............... 474/202, 203, 204, 205, 474/201, 242

[56] References Cited

U.S. PATENT DOCUMENTS

| 2,365,988 | 12/1944 | Abbott | 474/201 |
| 2,582,057 | 1/1952 | Mueller | 474/204 |
| 4,428,740 | 1/1984 | Moore | 474/242 |
| 4,457,742 | 7/1984 | Hattori et al. | 474/242 X |

FOREIGN PATENT DOCUMENTS 121350 4/1948 Sweden ............................... 474/242

Primary Examiner—James A. Leppink
Assistant Examiner—Frank H. McKenzie, Jr.
Attorney, Agent, or Firm—Lyon & Lyon

[57] ABSTRACT

Herein disclosed is a V-belt transmission device in which a plurality of substantially V-shaped metal members (2) and a plurality of resilient metal members (3) are alternately mounted to an endless metal belt member made of band steel and are in contact with each other to constitute a V-belt which is subjected to a tension between a driving V-pulley (5) and a driven V-pulley (6), thereby effecting a torque transmission between both the pulleys. Each of the V-shaped metal members (2) is provided with a substantially U-shaped groove (7) directed to the outside. Each of the resilient metal members is formed as a hollow roller to engage with recessed surfaces (8) which are formed in opposing surfaces of a pair of the V-shaped metal members (2). The V-shaped metal members (2) and the resilient metal members are fastened together at their outer peripheries by the metal belt member. The V-belt transmission device is characterized in that a pair of right and left engaging grooves (9) are formed at inward wall of arm end portions of each of the U-shaped grooves (7) formed in the V-shaped metal members (2) and stop members (10) are each formed in a plate having a narrow portion (10a) and at least one wide portion (10b), each of the stop members being engaged with the engaging grooves (9) with the narrow portion (10a).

7 Claims, 20 Drawing Figures

V-BELT TRANSMISSION DEVICE

BACKGROUND OF THE INVENTION

The present invention relates to a metal V-belt transmission device.

The present applicant has already proposed an improvement in a V-belt transmission device in which a plurality of V-shaped metal members and a plurality of elastic metal members are mounted to a metal belt member which consists of endless band steel and the like alternately in contact with each other in order to constitute a V-belt as a whole which is provided with a tension between a driving V-pulley and a driven V-pulley, thereby effecting a power transmission therebetween. In the transmission device, a substantially V-shaped groove which is opened outwards is formed in each V-shaped metal member so that the belt member is passed through it, each resilient member is constituted as a hollow roller so that it engages recesses which are formed in opposing surfaces of each pair of V-shaped metal members at both sides thereof and the belt member fastens them from the outer periphery thereof whereby the belt member is pressed to be in contact with each V-shaped metal member via each resilient metal member. In this case, there is required a means which makes it possible that each V-shaped metal member is prevented from drawing apart from the belt member, and furthermore, the V-shaped metal members are prevented from tilting by each other. It is preferable that the means be simple and inexpensive. Also, it is required to further increase the coupling between the V-shaped metal members and the metal belt.

SUMMARY OF THE INVENTION

An object of the invention is to overcome the above-noted various defects in the prior art.

According to the invention, in a V-belt transmission device in which a plurality of substantially V-shaped metal members and a plurality of resilient metal members are alternately mounted to an endless metal belt member made of band steel and are in contact with each other to constitute a V-belt which is subjected to a tension between a driving V-pulley and a driven V-pulley, thereby effecting a torque transmission between both the pulleys, each of said V-shaped metal members being provided with a substantially U-shaped groove directed to the outside, each of said resilient metal members being formed as a hollow roller to engage with recessed surfaces which are formed in opposing surfaces of a pair of said V-shaped metal members and said V-shaped metal members and said resilient metal members are fastened together at their outer peripheries by said metal belt member, said V-belt transmission device is characterized in that a pair of right and left engaging grooves are formed at inward wall of arm end portions of each of said U-shaped grooves formed in said V-shaped metal members and stop members are each formed in a plate having a narrow portion and at least one wide portion, each of said stop members being engaged with said engaging grooves with said narrow portion.

According to another object of the invention, said stop members are each provided with a projecting surface having an arc in cross section, so that the stop member is pressed against the outer peripheral surface of said belt member.

According to the invention, said stop members are each pressed to fit into said engaging grooves of each of said V-shaped metal members so that the width of said U-shaped groove of said V-shaped metal member is kept in a predetermined dimension and a spring means for preventing said stop members from drawing apart from the belt member is provided outside of said stop members.

DETAILED DESCRIPTION OF THE PREFERRED EMBODIMENTS

Figure 1:
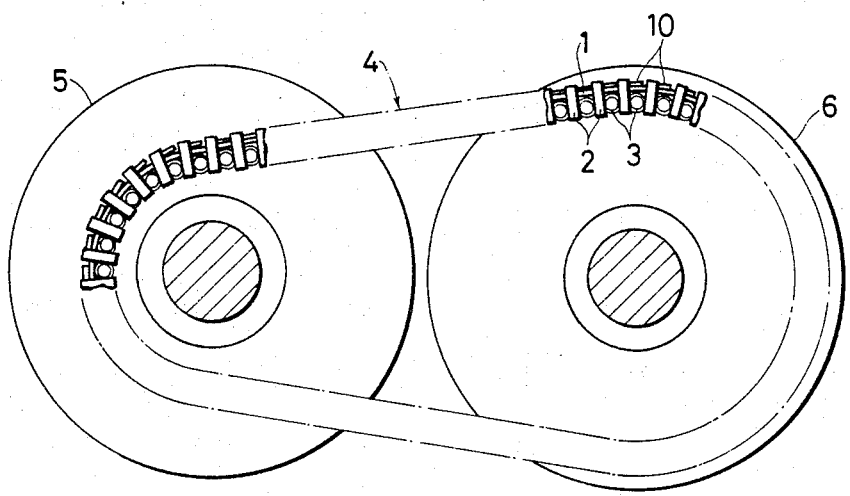
FIG. 1 is a side view showing a V-belt transmission device in accordance with the present invention.
Figure 2:
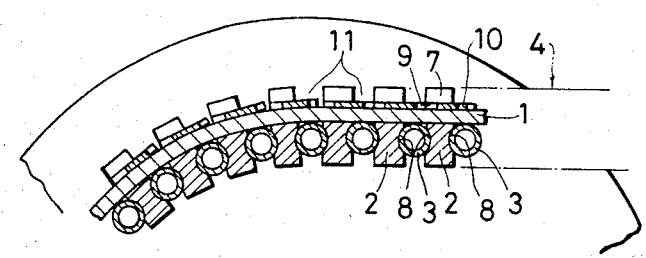
FIG. 2 is an enlarged cross-sectional view of the V-belt transmission device shown in FIG. 1.

The present invention will now be described in detail with reference to the accompanying drawings. Referring now to FIGS. 1 to 4 showing a V-belt variable transmission device, a plurality of V-shaped metal members or segments 2 and a plurality of associated resilient metal members 3 are mounted to an endless metal belt member 1 which consists of steel bands and the like and are alternately contacted with each other to constitute a V-belt unit 4 as a whole which is subjected to a tension between a driving V-pulley 5 and a driven V-pulley 6. A substantially V-shaped groove or recess 7 opened outwardly is formed in each V-shaped metal member 2 so that the belt member 1 is laid on the grooves 7. Each of the metal members 3 is constituted as a hollow roller so that it engages recesses 8, 8 which are formed in opposing surfaces of a pair of V-shaped metal members 2, 2. The belt member 1 fastens them by the outer periphery thereof. A pair of right and left engaging grooves 9, 9 are formed at the sides of outer ends of each groove 7 in each of the V-shaped metal members 2. A planar stop member 10 has a narrow portion 10a and a pair of wide portions 10b. The planar stop member 10 is detachably fitted into the pair of engaging grooves 9, 9 with the narrow portion 10a.

Figure 3:
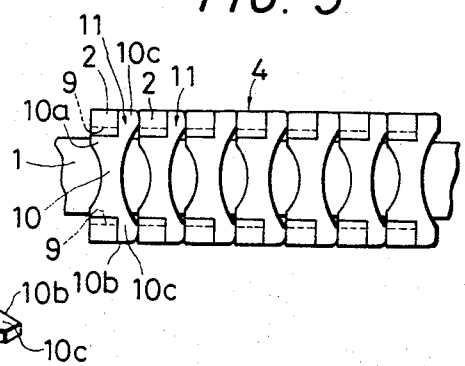
FIG. 3 is a plan view of the V-belt transmission device shown in FIG. 1.
Figure 4:
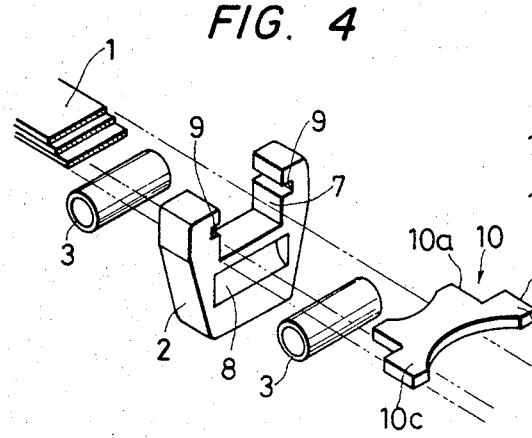
FIG. 4 is an exploded perspective view of the V-belt transmission device shown in FIG. 1.

The device shown in FIGS. 1 to 4 is applicable preferably to a variable transmission system for a motorcycle. For example, each stop member 10 is in contact with the adjacent upstream and down stream stop members 10 at its forward and rearward edges. The stop members 10 are positioned by each other as shown in FIG. 3. Each stop member 10 consists of a forward narrow portion 10a and rearward wide portion 10a. The wide portion 10b is provided with a pair of right and left pieces 10c, 10c which project outwardly at both sides. The stop members 10 as a whole is adapted to support the belt member 1 to prevent the belt member 1 from drawing apart from the V-shaped metal segment 2. In addition, the projecting pieces 10c, 10c extend into gaps 11 between a pair of V-shaped metal members 2, 2, so that each stop member 10 prevents the V-shaped metal members from tilting.

Figure 5:
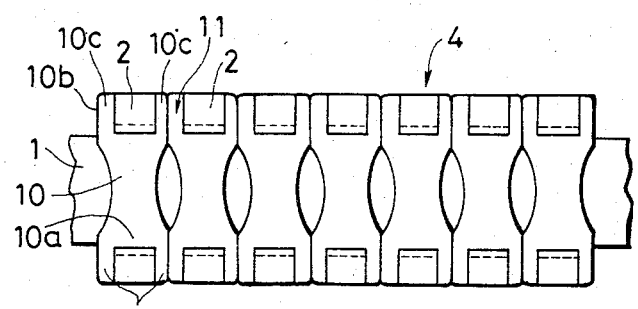
FIGS. 5 and 6 show another embodiment of the V-belt transmission device.
Figure 6:
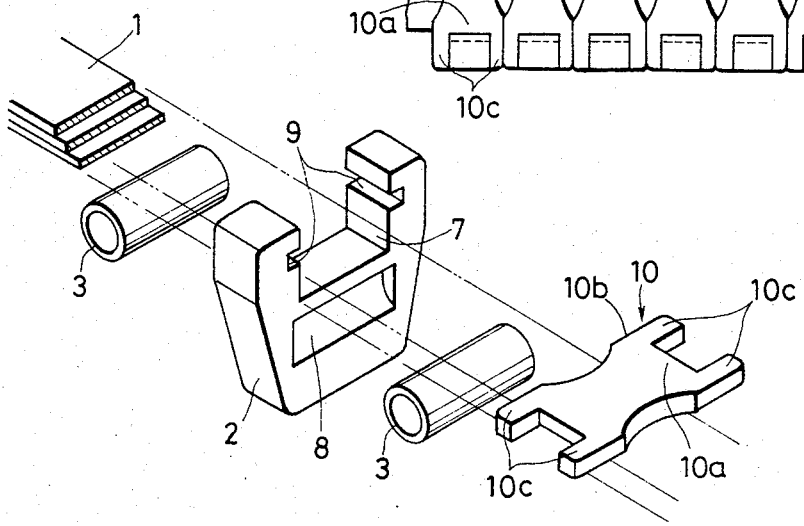

FIGS. 5 to 6 show a variant of the above-described structure. In FIGS. 5 and 6, each stop member 10 is provided with an intermediate narrow portion and a pair of forward and rearward wide portions 10b each of which is provided with a pair of right and left pieces 10c, 10c. Each forward piece 10c extending into gap 11 cooperates with a rearward piece 10c of an adjacent stop member 10c on the leading side.

Figure 7:
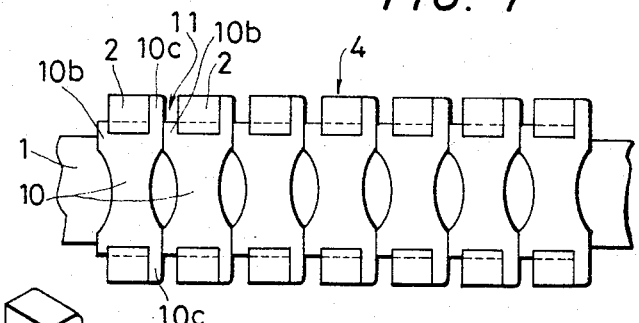
FIGS. 7 and 8 show still another embodiment of the V-belt transmission device.
Figure 8:
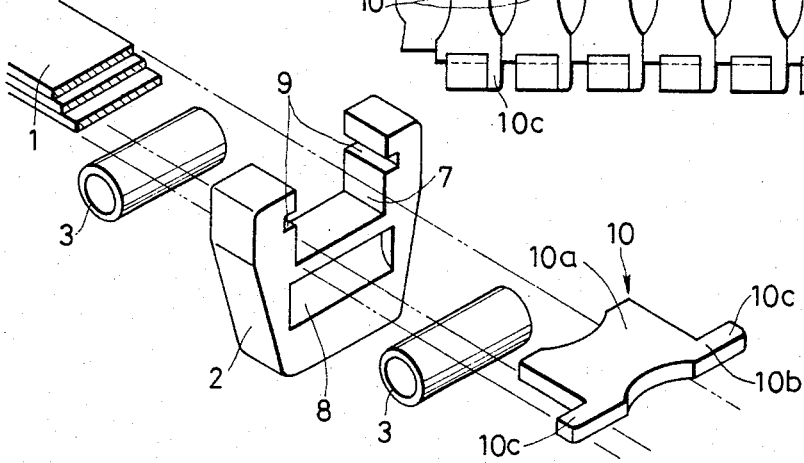
Figure 9:
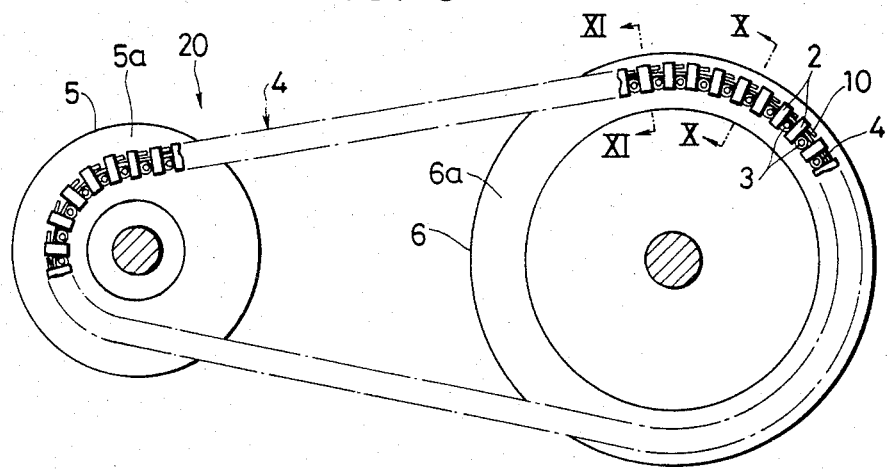
FIG. 9 is a side view showing a V-belt transmission device in accordance with another embodiment of the invention.
Figure 10:
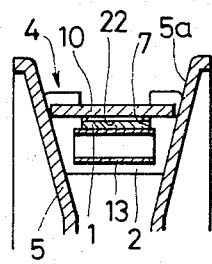
FIGS. 10 and 11 are cross-sectional views taken along line X—X and XI—XI of FIG. 9, respectively.
Figure 11:
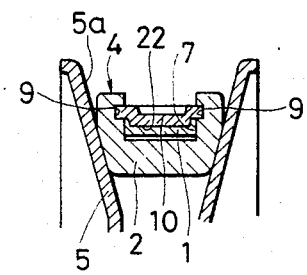
Figure 12:
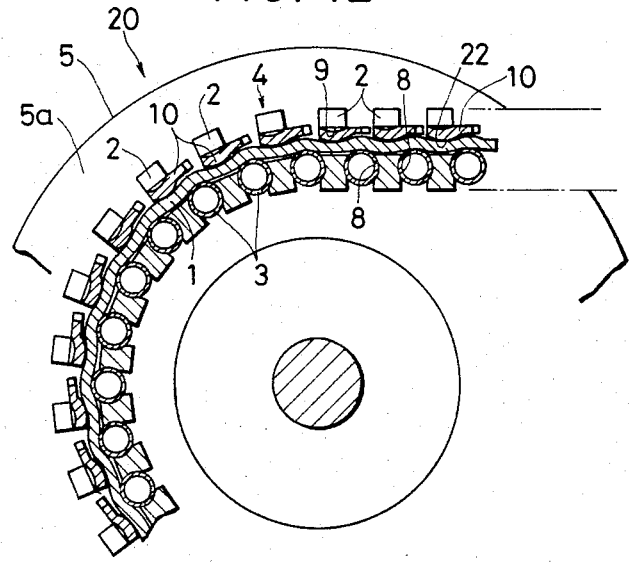
FIG. 12 is an enlarged cross sectional view of a part of the transmission device shown in FIG. 9.
Figure 13:
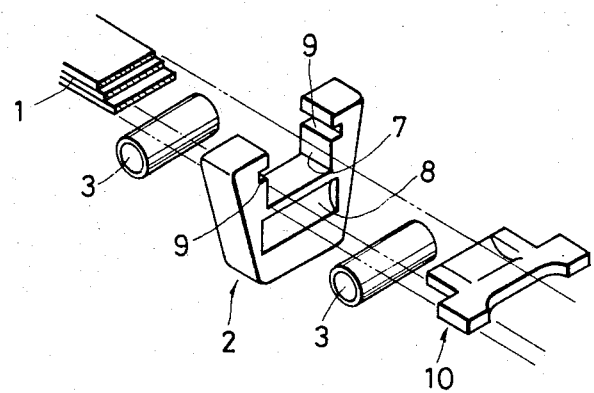
FIG. 13 is an exploded perspective view of the unit used in the transmission device shown in FIG. 9.

FIGS. 7 and 8 show another variant in which the pair of right and left forward pieces 10c, 10c are removed. However, a substantially same function as in the above mentioned variant can be obtained.

In accordance with the invention, as described above, each planar stop member 10 serves to prevent the belt member from drawing apart from the V-shaped metal segments 2 and to prevent the V-shaped metal members from drawing apart from the belt member. The transmission device may readily be produced at low cost. In addition, since each member 10 is detachably fitted into the pair of engaging grooves 9, 9 formed in the V-shaped metal segments 2, the assembling becomes easy.

An explanation will be given in respect of another embodiment in accordance with the invention with reference to FIGS. 9 to 13 showing a transmission device 20 for vehicles, a V-belt 4 is subjected to a tension between a V-groove 5a of a driving V-pulley 5 and a V-groove 6a of a driven V-pulley 6 so that a power transmission is effected between both the pulleys 5 and 6. A plurality of V-shaped metal members or segments 2 and a plurality of resilient hollow metal members 3 are mounted to a metal belt member 1.

In the embodiment shown in FIGS. 9 to 13, each V-shaped metal member 2, is constituted by a block like a relatively thick plate as in the foregoing embodiments. It should be noted that the position level of the belt member 1 is substantially at the same level as the center of the engaging contact surfaces of the V-shaped metal member 2 and the pulley flanks. In accordance with the embodiment shown in FIGS. 9 to 13, each V-shaped metal member 2 is provided with a stop member 10. The stop member 10 pressingly contacts against the outer peripheral surface of the belt member 1, thereby fastening the V-shaped metal member 2 onto the belt member 1. Not only the pressure due to the fastening of the belt member 1 but also the pressure due to the stop member 10 are applied to each V-shaped metal member 2, so that each V-shaped metal member 2 is stably fixed onto the belt member 1. The stop member 10 is inserted into a pair or right and left engaging grooves 9, formed at upper portion in the groove 7 as described above. A projecting surface 22 having an arc in cross section is formed at an end portion so that the stop member 10 pressingly contacts against the outer peripheral surface of the belt member 7 at the protruded surface.

Figure 14:
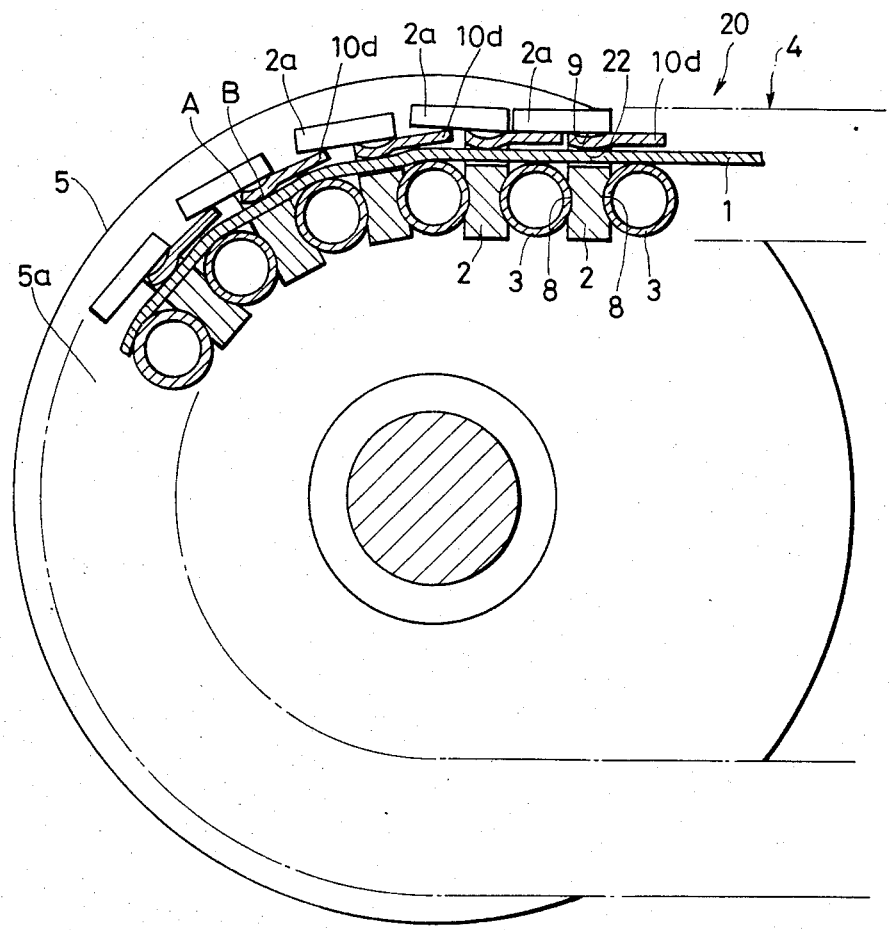
FIGS. 14 and 15 show another embodiment of the invention.
Figure 15:
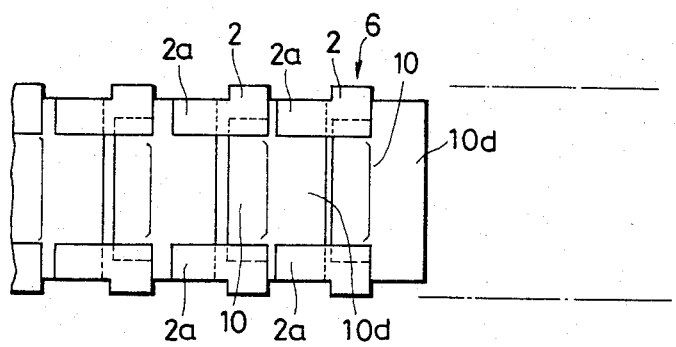

Although the transmission device shown in FIGS. 9 to 13 is constituted so that each stop member 10 always contacts with the outer peripheral surface of the belt member 1, the transmission may be constituted so that each stop member 10 is not always pressed against the outer peripheral surface of the belt member 1 as shown in FIGS. 14 and 15. More specifically, the stop member 10 is allowed to slightly move up and down in the right and left engaging grooves 9. The stop member 10 is not pressed against the belt member 1 at the straight portion of the V-belt 4. On the other hand, tail ends 10d of the stop member 10 are confronted with the inner surfaces of retaining portions 2a, 2a extending on the leading side from the top portions of the V-shaped metal segment 2 following the stop member 10. Thus, for example, when the V-shaped metal segments 2 in turn engage the V-pulley 5 and incline as shown in FIG. 14, the tail ends 10d in the stop member 10 come into contact with the retaining portions 2a, 2a. The stop member 10 is pushed thereby and inclines downwardly in the drawing. Thus, the stop member 10 is pressed against the belt member 1 at the protruding surface 22. The stop member 10 inclines at the end downwardly in the drawing about point A to be pressed against the belt member 1 at point B on the protruding surface 22.

In the foregoing embodiments, if the device is constituted in such a manner that the center position in the direction of height of the pulley contact surface of the V-shaped metal member substantially coincides with the center position of the metal belt, the difference in speed between the V-shaped metal member and the metal belt upon transferring from the rotation region of the belt in the V-pulley to the linear moving region between the pulleys may be suppressed. Thus, it is advantageous that the torque transmission loss due to their sliding friction in the above mentioned linear moving region. However, a drawback is caused, in which the grooves into which is fitted the metal belt are formed as a deep groove which extends inside from the center of the V-shaped metal member, so that the rigidity in the transverse direction of the V-shaped metal members becomes insufficient, thereby lowering the pressure between metal members and the V-pulleys.

Figure 16:
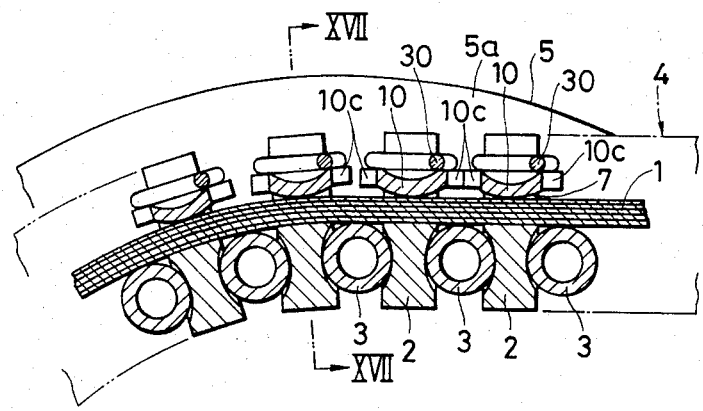
FIG. 16 is an enlarged partial view showing a cross section of another transmission device according to the invention.
Figure 17:
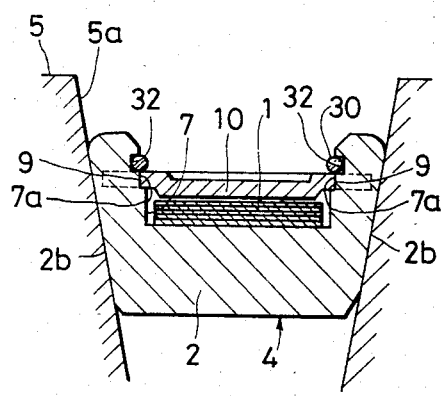
FIG. 17 is a transversal cross-sectional view taken along a line XVII—XVII of FIG. 16.
Figure 18:
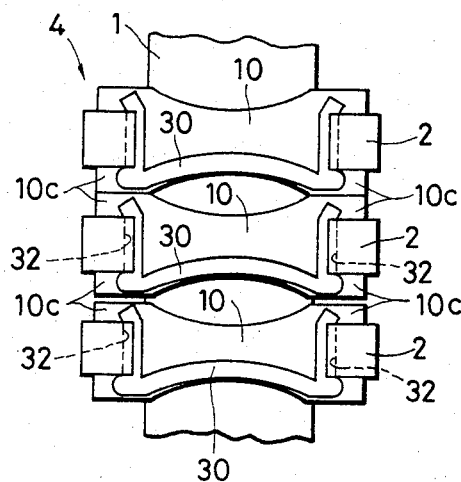
FIG. 18 is a plan view showing the unit shown in FIG. 17.

Another embodiment of the invention is to remove the above mentioned drawback and provide a transmission device which is easy to assemble. In the V-belt transmission device shown in FIGS. 16 to 18, a plurality of V-shaped metal members are mounted on an endless metal belt in a manner as described above. A stop member 10 for the metal belt 1 is pressed to be fitted into the opening end of each groove 7 so that the width of the groove 7 is kept to be a desired dimension by the stop member 10 in accordance with this embodiment. The outer half portion of the contact surface 2b which overlaps with the groove 7 does not tilt inwardly when each V-shaped metal member 10 is pressed against the V-pulley 5. As a result, the contact surface 2b is contacted with the V groove 5a of the pulley 5 over its overall surface, so that any sliding loss is not caused between the pulley 5 and the V-shaped metal member 10.

In addition, a clip 30 which has a nature of a spring and which prevents each stop member 10 from getting out of position is provided so as to be positioned outside each stop member 10 in each groove 7 in accordance with the invention. The stop member 10 is prevented from dropping apart without fail by the clip 30 even if the stop member 10 is formed in such a manner as to be able to be pressed into the groove 7 from the outside. It is possible that the assembling of the clip 30 itself is achieved from the outside owing to its nature as a spring. It is possible to assemble both the stop member 10 and the clip 30 from the outside of the groove 7. That is, the assembling is remarkably enhanced in comparison with the case where they are assembled from the longitudinal direction or oblique direction of the metal belt 1.

Figure 19:
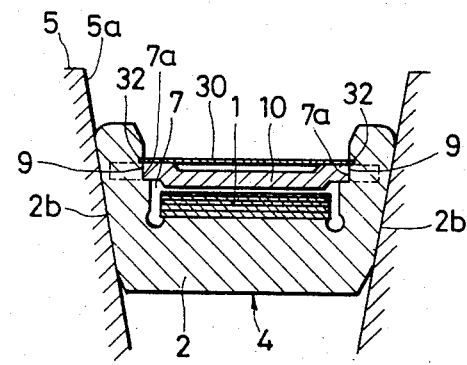
FIG. 19 is a transversal cross-sectional view, similar to FIG. 17, of a unit used in a transmission device in accordance with the present invention.
Figure 20:
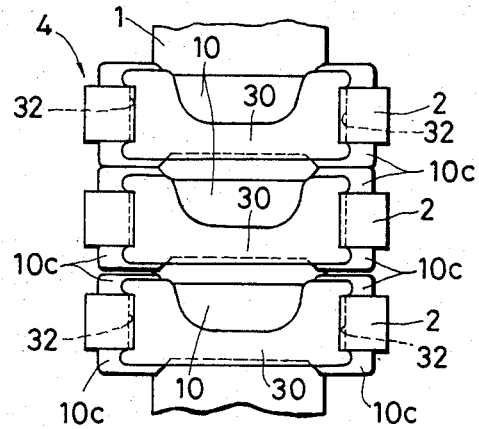
FIG. 20 is a plan view of the unit shown in FIG. 19.

Although the stopper member 10 is formed of a V-shaped resilient rod member which is resiliently engaged between grooves 32, 32 formed in the inner surfaces of groove walls 7a, 7a at both sides of the groove 7, it is to be noted that the invention is not limited thereto. For example, the stop member 10 may be formed of a plate spring as shown in FIGS. 19 and 20.

In case the resilient metal members 3 are interposed between the adjacent V-shaped metal members 2 as in the above mentioned embodiment, the V-shaped metal members 2 may tilt due to gap between neighboring metal member 2 in running direction in the linear moving region of the belt. Then, the stop member 10 is provided with projected portions projecting toward running direction between the adjacent metal members 2 so that neighboring projected portions are in contact with each other, thereby preventing the metal members 2 from tilting.

Specifically, the stop member 10 is provided with the projected portions 10c, 10c at front and rear sides thereof extending toward running direction from the recessed groove 7. Recessed portions 9, 9 are formed in the lateral side end portions of the stop member 10 at a position between the projected portions 10c, 10c to provide force fitting engagement with the groved walls 7a of the groove 7. With the structure, on the linear moving region of the belt, the adjacent V-shaped metal members 2, 2 are held in stabilized manner because of the abutment between the stop members 10, 10 at their projected portions 10c, 10c.

According to the present invention even if the recessed groove is deeply formed so that the center position in the contact surface of the V-shaped metal member substantially coincides with the center position of the metal belt in the direction of height of the pulley, the transversal width of the recessed groove is kept to be a normal dimension by stop members force-fitted with the opening end thereof. Therefore, the outer half portion of the pulley contact surface which is opposite side of the recessed groove, also provides press-contact with the V groove of the pulley without fail, thereby enhancing the power transmission efficiency. In addition, the stop member is prevented from being released from the recessed groove toward outer direction because of the biasing clip provided at the outside of the stop member. As a result the stop member does not get out of position even if the stop member is formed in such a way that it is easily pressed into the recessed groove from the outer direction thereof. It is possible that the stop members and the clips are assembled into the recessed grooves in order from the outside so as to easily assemble the V-belt. In addition, the stop member is provided with the projected portions which are projected into the gaps between the adjacent V-shaped metal members between resilient metal member is interposed so that V-shaped metal members are held by the mutually abutting projected portions, thereby preventing the metal members from tilting. As a result, smooth and stable power transmission is attainable, and precise assemblage of the metal member and stop member results.

What is claimed is:

1. In a V-belt transmission device in which a plurality of substantially V-shaped metal members and a plurality of resilient metal members are alternately mounted to an endless metal belt member made of band steel and are in contact with each other to consitutute a V-belt which is subjected to a tension between a driving V-pulley and a driven V-pulley, thereby effecting a torque transmission between both the pulleys, each of said V-shaped metal members being provided with a substantially U-shaped groove directed to the outside, each of said resilient metal members being formed as a hollow roller to engage with recessed surfaces which are formed in opposing surfaces of a pair of said V-shaped metal members and said V-shaped metal members and said resilient metal members are fastened together at their outer peripheries by said metal belt member, said V-belt transmission device characterized in that a pair of right and left engaging grooves are formed at inward wall of arm end portions of each of said U-shaped grooves formed in said V-shaped metal members and stop members are each formed in a plate having a narrow portion and at least one wide portion, each of said stop members being engaged with said engaging grooves with said narrow portion.

2. The V-belt transmission device according to claim 1, wherein each of said stop members is confronted with the outer peripheral surface of said belt member, and said stop members are pressed against said outer peripheral surface of said belt member, thereby securing said V-shaped metal members onto said belt member.

3. The V-belt transmission device according to claim 2, wherein said stop members are each provided with a projecting surface having an arc in cross section, so that the stop member is pressed against the outer peripheral surface of said belt member.

4. The V-belt transmission device according to claim 2, said stop members are each always pressed against the outer peripheral surface of said belt member.

5. The V-belt transmission device according to claim 2, wherein tail ends of said stop members extend in a trailing side of said V-belt and engage with retaining portions at a leading end of the V-shaped metal member following said stop member, so that the stop member is pushed to be inclined by said retaining portions upon the engagement between said V-belt and said driving V-pulley, to pressingly engage with said outer peripheral surface of said belt member.

6. The V-belt transmission device according to claim 2, wherein said stop members are each pressed to fit into said engaging grooves of each of said V-shaped metal members so that the width of said U-shaped groove of said V-shaped metal member is kept in a predetermined dimension and a spring means for preventing said stop members from drawing apart from the belt member is provided outside of said stop members.

7. The V-shaped belt transmission device according to claim 6, wherein each of said stop members is provided with projections projecting into gaps defined between the adjacent V-shaped metal members so that said stop members are brought into contact with each other at said projections.

* * * * *